United States Patent
Gupta

(10) Patent No.: US 12,330,968 B2
(45) Date of Patent: Jun. 17, 2025

(54) METHOD FOR CONTROLLING ODOR AND TASTE PRODUCING METABOLITES IN WATER SYSTEMS THROUGH USE OF PRIMARY AND SECONDARY OXIDATION PROCESSES

(71) Applicant: ECOLAB USA INC., St. Paul, MN (US)

(72) Inventor: Amit Gupta, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 309 days.

(21) Appl. No.: 17/559,149

(22) Filed: Dec. 22, 2021

(65) Prior Publication Data

US 2022/0204370 A1    Jun. 30, 2022

Related U.S. Application Data

(60) Provisional application No. 63/131,390, filed on Dec. 29, 2020.

(51) Int. Cl.
| | |
|---|---|
| *C02F 1/72* | (2023.01) |
| *C02F 1/32* | (2023.01) |
| *C02F 1/76* | (2023.01) |
| *C02F 101/20* | (2006.01) |
| *C02F 101/34* | (2006.01) |
| *C02F 101/38* | (2006.01) |

(52) U.S. Cl.
CPC ............... *C02F 1/722* (2013.01); *C02F 1/32* (2013.01); *C02F 1/76* (2013.01); *C02F 2101/203* (2013.01); *C02F 2101/34* (2013.01); *C02F 2101/38* (2013.01); *C02F 2209/29* (2013.01); *C02F 2303/02* (2013.01)

(58) Field of Classification Search
CPC .... C02F 1/722; C02F 1/32; C02F 1/76; C02F 2101/203; C02F 2101/34; C02F 2101/38; C02F 2209/29; C02F 2303/02; C02F 2101/206; C02F 2101/30; C02F 2103/007; C02F 2103/02; C02F 2209/008; C02F 1/72

See application file for complete search history.

(56) References Cited

U.S. PATENT DOCUMENTS

| | | | |
|---|---|---|---|
| 9,107,967 B2 | 8/2015 | O'Connell | |
| 9,567,216 B2 | 2/2017 | McIlwaine | |
| 9,909,219 B2 | 3/2018 | Strominger et al. | |
| 10,501,345 B2 | 12/2019 | Xiong et al. | |
| 2005/0008554 A1 | 1/2005 | Nowosielski-Slepowron et al. | |
| 2006/0289362 A1* | 12/2006 | Yamauchi | C02F 1/32 210/749 |
| 2007/0256979 A1* | 11/2007 | Condit | C02F 1/76 210/732 |
| 2008/0206215 A1 | 8/2008 | Ziegler | |
| 2015/0291462 A1* | 10/2015 | Strominger | C23F 11/163 210/758 |
| 2018/0244550 A1* | 8/2018 | Gupta | C02F 1/76 |
| 2018/0273381 A1 | 9/2018 | Xiong et al. | |

FOREIGN PATENT DOCUMENTS

| | | |
|---|---|---|
| CN | 105621576 A | 6/2016 |
| CN | 108394942 A | 8/2018 |
| CN | 110102165 A | 8/2019 |
| WO | 2011069065 A1 | 6/2011 |

OTHER PUBLICATIONS

Glaze, William H. "Water, 6. Treatment by oxidation processes." Ullmann's Encyclopedia of Industrial Chemistry (2000) (hereinafter NPL). (Year: 2000).*
Douglas, A.E., 2020. The microbial exometabolome: ecological resource and architect of microbial communities. Philosophical Transactions of the Royal Society B, 375(1798), p. 20190250. (Year: 2020).*
Wang, Ding et al. "UV/chlorine control of drinking water taste and odour at pilot and full-scale," Chemosphere 136, (2015) 239-244.
Glaze, William H. et al. "Evaluating oxidants for the removal of model taste and odor compounds from a municipal water supply." Journal American Water Works Association 82 (1990): 79-84.
International Search Report and Written Opinion for International Application No. PCT/US2021/064851 mailed Mar. 28, 2022, 12 pages.

* cited by examiner

*Primary Examiner* — Magali P Slawski
*Assistant Examiner* — Bernadette Karen Mcgann
(74) *Attorney, Agent, or Firm* — Eric D. Babych; Barnes & Thornburg LLP

(57) ABSTRACT

A method of oxidizing a component of an aqueous medium is provided. The method includes adding an effective amount of an oxidizing composition to the aqueous medium. The oxidizing composition includes an ingredient, such as hydrogen peroxide, a percarbonate salt, a peroxy compound, a chlorite or alkali metal salt thereof, a chlorate or alkali metal salt thereof, or any combination thereof. The method also includes oxidizing the component. The component may be a metal, a mineral, a microbial metabolite, an organic molecule, or combination thereof. The method also includes modulating the application of the oxidizing composition based on a measured aqueous medium parameter.

20 Claims, No Drawings

METHOD FOR CONTROLLING ODOR AND TASTE PRODUCING METABOLITES IN WATER SYSTEMS THROUGH USE OF PRIMARY AND SECONDARY OXIDATION PROCESSES

BACKGROUND

1. Field of the Invention

The present disclosure generally relates to controlling taste and odor in water. More particularly, the disclosure relates to using oxidation processes to control taste and odor in municipal water.

2. Description of the Related Art

Industrial water systems are subject to various types of fouling. Fouling can occur in the form of mineral fouling, biological fouling, and often combinations of the two. In fact, mineral fouling often provides an anchor and substrate for biological infestations, and some organisms leach or secrete minerals onto industrial water system surfaces.

Fouling may occur as a result of a variety of mechanisms including deposition of air-borne, water-borne, and water-formed contaminants, water stagnation, process leaks, and other factors. If allowed to progress, fouling can cause a system to suffer from decreased operational efficiency, premature equipment failure, loss in productivity, loss in product quality, and (in particular in the case of microbial fouling) increased health-related risks.

Biological fouling results from rapidly spreading microbial communities that develop on any wetted or semi-wetted surface of the water system. Once these microorganisms are present in the bulk water, they will form biofilms on the system's solid surfaces.

Exopolymeric substances secreted from the microorganisms aid in the formation of biofilms as the microbial communities develop. These biofilms form complex ecosystems that establish a means for concentrating nutrients and offer protection for growth. Biofilms can accelerate scale, corrosion, and other fouling processes. Not only do biofilms contribute to reduction of system efficiencies, they also provide an excellent environment for microbial proliferation that can include pathogenic bacteria. It is therefore important that biofilms and other fouling processes are reduced to the greatest extent possible to maximize process efficiency and minimize the health-related risks from water-borne pathogens.

Many different prior art approaches have attempted to control biological fouling of industrial processes. The most commonly used method is the application of biocidal compounds to the process waters. The biocides applied may be oxidizing or non-oxidizing in nature. Due to several different factors, such as economics and environmental concerns, oxidizing biocides may be preferred. Oxidizing biocides, such as chlorine gas, hypochlorous acid, bromine derived biocides, and other oxidizing biocides are widely used in the treatment of industrial water systems.

Certain microorganisms, as a function of their growth and metabolism, can produce metabolites that are secreted out of the microbial entity into the environment. In addition, as microorganisms are killed by the oxidizing or non-oxidizing biocides, microorganisms lose integrity and metabolites may be released from the microorganisms causing taste and odor issues in water that are of particular concern in municipal drinking water. Taste and odor issues may be worse following treatment with oxidizing biocides, such as chlorine dioxide, that are applied for oxidation of other components, such as iron and manganese, and not for disinfection.

BRIEF SUMMARY

A method of oxidizing a component of an aqueous medium is provided. The method includes adding an effective amount of an oxidizing composition to the aqueous medium, wherein the oxidizing composition comprises an ingredient selected from the group consisting of hydrogen peroxide, a percarbonate salt, a peroxy compound, a chlorite or alkali metal salt thereof, a chlorate or alkali metal salt thereof, and any combination thereof, and oxidizing the component, wherein the component is selected from the group consisting of a metal, a mineral, a microbial metabolite, an organic molecule, and any combination thereof.

In some aspects, the effective amount is from about 0.1 ppm to about 1000 ppm.

In some aspects, the chlorate is sodium chlorate.

In some aspects, the metal is selected from the group consisting of iron, manganese, copper, and any combination thereof.

In some aspects, the microbial metabolite is geosmin, methylisoborneol (MIB), cyanotoxins, microcystin, or any combination thereof.

In some aspects, the method further comprises adding chlorine dioxide to the aqueous system at a concentration of about 0.02 ppm to about 20 ppm.

In some aspects, the chlorine dioxide is added to the aqueous system before, after, and/or concurrently with the oxidizing composition.

In some aspects, the chlorine dioxide is added continuously or intermittently to the aqueous medium.

In some aspects, the method includes exposing the aqueous medium to ultraviolet light.

In some aspects, the oxidizing composition is added continuously or intermittently to the aqueous medium.

In some aspects, the method includes measuring a concentration of one or more ingredients of the oxidizing composition in the aqueous medium.

In some aspects, the method includes adjusting the effective amount of the oxidizing composition being added to the aqueous medium based on the measured concentration of one or more ingredients in the aqueous medium.

In some aspects, the method includes measuring a concentration of one or more of the components in the aqueous medium.

In some aspects, the method includes adjusting the effective amount of the oxidizing composition being added to the aqueous medium based on the measured concentration of one or more of the components in the aqueous medium.

In some aspects, the method includes measuring a property of the aqueous medium, wherein the property is selected from the group consisting of pH, temperature, turbidity, ion concentration, microbial load, suspended solids, total dissolved solids, oxidation reduction potential (ORP), conductivity, and any combination thereof.

In some aspects, the oxidizing composition is a liquid.

In some aspects, the oxidizing composition comprises a chlorate and hydrogen peroxide.

In some aspects, the oxidizing composition has substantially no biocidal effect at a use concentration.

In some aspects, the oxidizing composition may be a precursor for the production of an oxidizing chemistry In some aspects, the aqueous medium is municipal water, waste water, recirculating water, industrial process water, food and beverage ingredient water, influent stream from a river, influent stream from a lake, or any combination thereof.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

The relationship and functioning of the various elements of the embodiments may better be understood by reference to the following detailed description. However, embodiments are not limited to those explicitly described below.

Certain embodiments of the present disclosure address taste and odor issues of water treated with oxidizing biocides. Treating the water with additional chlorine dioxide does not eliminate the undesirable taste and/or odor produced from treating the water with oxidizing biocides.

In aqueous systems where oxidizing biocides are used for treating certain contaminants, such as iron or manganese, the non-microbial contaminants consume some of the oxidizing biocide so higher amounts of the oxidizing biocides need to be added, which can increase the release of the secondary metabolites that cause odor and taste issues. An oxidizing composition that is non-biocidal may be useful in such treatment conditions.

A method of oxidizing a component of an aqueous medium is provided. The method includes adding an effective amount of an oxidizing composition to the aqueous medium, and oxidizing the component.

The oxidizing composition includes an oxidant. Examples of oxidants include, but are not limited to, hydrogen peroxide, a percarbonate salt, a peroxy compound, a chlorite or alkali metal salt thereof, and a chlorate or alkali metal salt thereof. In some aspects, the percarbonate salt may be sodium percarbonate. In some aspects, the alkali metal salt of chlorite may be sodium chlorite. In some aspects, the alkali metal salt of chlorate may be sodium chlorate. In some aspects, the oxidizing composition is a liquid.

In some aspects, the oxidizing composition may comprise, consist essentially of, or consist of chlorate, hydrogen peroxide, and water. The oxidizing composition may comprise a concentration of chlorate that is in a range of about 5% by weight to about 75% by weight. The concentration of chlorate in the oxidizing composition may be about 40% by weight. The concentration of hydrogen peroxide in the oxidizing composition may be in the range of about 2% by weight to about 30% by weight. The concentration of hydrogen peroxide in the oxidizing composition may be about 8% by weight.

In some aspects, the effective amount of the oxidizing composition is from about 0.1 ppm to about 1000 ppm. In some aspects, the effective amount of the oxidizing composition is from about 5 ppm to about 1000 ppm, about 5 ppm to about 500 ppm, about 5 ppm to about 400 ppm, about 5 ppm to about 300 ppm, about 5 ppm to about 200 ppm, about 10 ppm to about 1000 ppm, about 10 ppm to about 500 ppm, about 100 ppm to about 1000 ppm, about 100 ppm to about 500 ppm, or about 100 ppm to about 400 ppm.

In some aspects, the oxidizing composition has substantially no biocidal effect at the use concentration. For example, one of ordinary skill in the art would not ordinarily add the oxidizing composition at the presently disclosed amounts based on the microbial load in the aqueous medium.

The means of adding the oxidizing composition to the aqueous medium is not particularly limited and one of ordinary skill in the art has at his or her disposal a variety of ways of introducing the oxidizing composition into the aqueous medium. The oxidizing composition may be added continuously or intermittently to the aqueous medium.

The component may be a metal, a mineral, a microbial metabolite, an organic molecule, or any combination thereof. Examples of a metal present in the aqueous medium include, but are not limited to, iron, manganese, or copper. In some aspects, the microbial metabolite is geosmin, MIB, microcystin, or any combination thereof. In some aspects, the microbial metabolite is geosmin. In some aspects, the microbial metabolite is MIB. In some aspects, the microbial metabolite is microcystin.

In some aspects, the method comprises, consists essentially of, or consists of adding an oxidizing composition into the aqueous medium as the sole oxidative step to leverage the oxidizing capability of the components of the chemistry being applied. The dose for this primary oxidation step may be at higher levels since a secondary oxidation step to augment the primary step may not be included. This would aid with oxidizing the oxidizable components present in the water and thus controlling the taste and odor components in the water.

In some aspects, the method includes a two-step process where an oxidizing composition is first added to the aqueous medium followed by chlorine dioxide. The oxidizing composition may be added into the water stream as a primary oxidative step to leverage the oxidizing capability of the components of the chemistry being applied. The dose for this primary oxidation step may be at levels required for oxidation based on oxidizable contaminant level, since a secondary oxidation step would augment the primary step. This primary oxidation step would aid with oxidizing the oxidizable components present in the water. Subsequently, chlorine dioxide may be injected as a secondary oxidative step to aid further oxidation. Without being bound by any particular theory, it is intended that the primary oxidation step reduces the "demand" for the secondary oxidation step, thus allowing the secondary oxidant to be introduced at low levels, be more effective and also avoid a significant "lysing" effect, thereby controlling the taste and odor components in the water.

In some aspects, the chlorine dioxide may be produced using the oxidizing composition used in the first step. For example, a mixture of hydrogen peroxide and sodium chlorate could be used as the oxidizing composition and could also be used as one of the precursors for producing chlorine dioxide. The hydrogen peroxide and sodium chlorate could be mixed with an acid, such as sulfuric acid, to produce chlorine dioxide.

When chlorine dioxide is added to the aqueous system, it may be added at a concentration of about 0.02 ppm to about 20 ppm. In some aspects, the amount of chlorine dioxide added to the aqueous system may be from about 0.02 ppm to about 10 ppm, about 0.02 ppm to about 5 ppm, or about 0.1 ppm to about 5 ppm.

The addition location and timing of addition of the chlorine dioxide is not particularly limited. In some aspects, the chlorine dioxide is added to the aqueous system before, after, and/or concurrently with the oxidizing composition. In some aspects, the chlorine dioxide is added continuously or intermittently to the aqueous medium.

In some aspects, the method includes exposing the aqueous medium to ultraviolet (UV) light.

A UV irradiation system includes an UV radiation generator that is capable of transmitting flashes, or pulses, of energy and providing increased efficacy in destroying microorganisms. The UV radiation treatment makes the effluent water more suitable for reuse. The efficacy of destroying bacterial spores and non-spore forming bacteria in effluent water can be increased 30 to 2000 times if UV radiation is applied. Effective dosing of UV is significantly influenced by the quality of the effluent water and the constituents present in the water that absorb or shield/block UV light. The transmission of UV light through the effluent water decreases as the level of organic and inorganic contamination increases. Some factors in determining water quality and effectiveness of UV transmission include, but are not limited to, color, metals, organic matter, suspended and dissolved solids, and turbidity of the water. In some embodiments, an ultraviolet irradiation system provides a transmission of approximately 200 nanometers (nm) to 300 nm.

In some aspects, the method includes measuring a concentration of one or more ingredients of the oxidizing composition in the aqueous medium.

In some aspects, the method includes adjusting the effective amount of the oxidizing composition being added to the aqueous medium based on the measured concentration of one or more ingredients in the aqueous medium.

As used herein, "aqueous medium" refers to a static or flowing liquid comprising water. For example, the aqueous medium may be municipal water.

The aqueous medium may be monitored using a plurality of sensors to determine at least one property of the aqueous medium. Examples of certain properties that may be measured include, but are not limited to, pH, temperature, turbidity, ion concentration, microbial load, suspended solids, total dissolved solids, ORP, or conductivity.

Other measurements of the aqueous medium may include determining a concentration of one or more of the components in the aqueous medium. The means for determining the concentration of one of the components is not particularly limited and one of skill in the art could select the appropriate assay for detecting the desired component.

In some aspects, the method includes adjusting the effective amount of the oxidizing composition being added to the aqueous medium based on the measured concentration of one or more of the components in the aqueous medium. For example, high levels of geosmin in the aqueous medium may necessitate an increase in the effective amount of the oxidizing composition added to the aqueous medium.

In some aspects, the aqueous medium is municipal water, waste water, recirculating water, industrial process water, food and beverage ingredient water, or any combination thereof.

In certain aspects, a control system includes a monitoring and controlling unit that comprises a controller and a plurality of sensors. Each of the plurality of sensors can be in communication with the controller. For example, if the unit comprises five sensors, each of the five sensors can be in communication with the controller. In certain aspects, the controller can be attached to a skid, or other type of support member, to allow for mobility.

As used herein, the term "controller" refers to a manual operator or an electronic device having components, such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components.

The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, and/or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components, such as a signal conditioner or system monitor, may be included to facilitate signal transmission and signal-processing algorithms.

In certain aspects, the controller includes hierarchy logic to prioritize any measured or predicted properties associated with system parameters. For example, the controller may be programmed to prioritize system pH over conductivity, or vice versa. It should be appreciated that the object of such hierarchy logic is to allow improved control over the system parameters and to avoid circular control loops.

In some embodiments, the monitoring and controlling unit and method associated therewith includes an automated controller. In some embodiments, the controller is manual or semi-manual. For example, when the system includes one or more datasets received from various sensors in the system, the controller may either automatically determine which data points/datasets to further process or an operator may partially or fully make such a determination. A dataset for an industrial body of water, for instance, may include variables or system parameters such as ORP, dissolved oxygen (DO), conductivity, pH, turbidity, concentrations of certain chemicals, such as biocides, scale inhibitors, friction reducers, acids, bases, and/or oxygen scavengers, levels of ions (e.g., determined empirically, automatically, fluorescently, electrochemically, colorimetrically, measured directly, calculated), temperature, pressure, flow rate, total dissolved or suspended solids, etc. Such system parameters are typically measured with any type of suitable data capturing equipment, such as sensors designed specifically for these parameters, e.g., pH sensors, ion analyzers, temperature sensors, thermocouples, ORP sensors, pressure sensors, corrosion probes, and/or any other suitable device or sensor. Data capturing equipment is in communication with the controller and, according to some embodiments, may have advanced functions (including any part of the control algorithms described herein) imparted by the controller.

The monitoring and controlling unit may comprise a plurality of sensors, which are capable of analyzing the water and transmitting data regarding the water to the controller. The plurality of sensors can comprise, for example, sensors for measuring conductivity, pH, ORP, biocide concentration, turbidity, temperature, flow, and DO in the water. The monitoring and controlling unit may comprise any of these sensors, all of these sensors, a combination of two or more of these sensors, one or more additional sensors not specifically mentioned here, and the sensors may be in communication with the controller. Other types of sensors contemplated by the present disclosure include, but are not limited to, oil in water sensors, total dissolved solids sensors, total organic carbon sensor, and total suspended solids sensors.

The presently disclosed monitoring and controlling system comprises, in certain embodiments, one or more chemical injection pumps. Each chemical injection pump may be in fluid communication with a storage device. Each storage device may comprise one or more chemicals and the chemical injection pumps may transport those chemicals into the body of water. In some embodiments, the chemical injection pump comprises the storage device. The chemical injection pumps may be in communication with the controller in any number of ways, such as through any combination of wired connection, a wireless connection, electronically, cellularly, through infrared, satellite, or according to any other types of communication networks, topologies, protocols, standards and more. Accordingly, the controller can send signals to the pumps to control their chemical feed rates.

In certain embodiments, the monitoring and controlling system is implemented to have the plurality of sensors provide continuous or intermittent feedback, feed-forward, and/or predictive information to the controller, which can relay this information to a relay device, such as a Gateway, which can transmit the information via cellular communications to a remote device, such as a cellular telephone, computer, and/or any other device that can receive cellular communications. This remote device can interpret the information and automatically send a signal (e.g. electronic instructions) back, through the relay device, to the controller to cause the controller to make certain adjustments to the output of the pumps. The information can also be processed internally by the controller and the controller can automatically send signals to the pumps to adjust the amount of chemical injection, for example. Based upon the information received by the controller from the plurality of sensors or from the remote device, the controller may transmit signals to the various pumps to make automatic, real-time adjustments, to the amount of chemical that the pumps are injecting into the water.

Alternatively, an operator of the remote device that receives cellular communications from the controller can manually manipulate the pumps through the remote device. The operator may communicate instructions, through the remote device, cellularly or otherwise, to the controller and the controller can make adjustments to the rate of chemical addition of the chemical injection pumps. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the water by one or more of the injection pumps, or any combination of the foregoing. The controller and/or the remote device is also capable of making any of the foregoing adjustments or modifications automatically without the operator actually sending or inputting any instructions. Preset parameters or programs are entered into the controller or remote device so that the controller or remote device can determine if a measured property is outside of an acceptable range. Based on the information received by the plurality of sensors, the controller or remote device can make appropriate adjustments to the pumps or send out an appropriate alert.

In certain embodiments, the remote device or controller can include appropriate software to receive data from the plurality of sensors and determine if the data indicates that one or more measured properties of the water are within, or outside, an acceptable range. The software can also allow the controller or remote device to determine appropriate actions that should be taken to remedy the property that is outside of the acceptable range. For example, if the measured pH is above the acceptable range, the software allows the controller or remote device to make this determination and take remedial action, such as alerting a pump to increase the flow of an acid into the body of water.

The monitoring and controlling system and/or controller disclosed herein can incorporate programming logic to convert analyzer signals from the plurality of sensors to pump adjustment logic and, in certain embodiments, control one or more of a plurality of chemical injection pumps with a unique basis. Non-limiting, illustrative examples of the types of chemical injection pumps that can be manipulated include chemical injection pumps responsible for injecting biocides, scale inhibitors, friction reducers, acids, bases, sulfites, oxygen scavengers, and any other type of chemical that could prove to be useful in the particular aqueous industrial system. Particular examples of biocides, scale inhibitors, friction reducers, acids, bases, sulfites, and oxygen scavengers are all well-known in the art and all examples of such chemicals are within the scope of the present disclosure.

The sensors disclosed herein are operable to sense and/or predict a property associated with the water or system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value to determine if the input numerical value is within an optimum range, generate an output numerical value, convert the output numerical value into an output signal, e.g., an electrical signal, and transmit the output signal to a receiver, such as a pump incorporating such receiver capabilities or a remote device, such as a computer or cellular telephone, incorporating receiver capabilities. The receiver receives the output signal and either alerts an operator to make adjustments to flow rates of the pumps, or the receiver can be operable to cause a change in a flow rate of the pumps automatically, if the output numerical value is not within the acceptable range for that property.

The method is optionally repeated for a plurality of different system parameters, where each different system parameter has a unique associated property, or, alternatively, all system parameters can be analyzed concurrently by the plurality of sensors.

In some embodiments, system parameter information is received from the system and archived. In certain embodiments, system parameter information is processed according to a timetable or schedule. In some embodiments, system parameter information is immediately processed in real-time or substantially real-time. Such real-time reception may include, for example, "streaming data" over a computer network.

The presently disclosed methods can be used in a variety of applications. For example, the oxidizing composition can be used as a sacrificial oxidant to reduce demand on the converted chlorine dioxide molecule, in non-biocidal applications, where chlorite is a limitation, this approach may enable use of chlorine dioxide, in fresh-water or influent water treatment, in waste-water treatment where certain species of pollutants may require oxidation, in water streams that have a chemically reducing environment, to create an aerobic environment in water streams that have a significant anaerobic environment, in water systems where a higher dose of oxidizing biocide can have a detrimental impact but could benefit with a lower dose, and in open recirculating cooling water systems in the food and beverage industry, papermaking processes, and mining industries.

Examples

The oxidation of iron (Fe) with sodium chlorate was tested. The methodology principle is that iron is soluble in water in the ferrous form and upon oxidation the ferrous form would convert to the ferric form and come out of solution. Therefore, total iron could be measured in an "unfiltered" sample and then the extent of oxidation could be measured in the same treated sample by filtering the sample to remove any insoluble oxidized iron. The samples were analyzed by ICP (Inductively Coupled Plasma) to measure the iron content.

The oxidation test data is shown below in Table 1. In the first column, the iron concentration is calculated as Fe within the Ferrous Sulfate salt. In the second column, the concentration is measured as sodium chlorate even though hydrogen peroxide was added as well. In the 4th and 5th columns, the iron concentration is measured in 'unfiltered' and filtered samples, respectively, to measure the effective oxidation efficiency. The last column on the right is the calculated % reduction in Fe between the filtered and unfiltered samples. These data show that sodium chlorate and hydrogen peroxide can oxidize iron efficiently.

TABLE 1

Oxidation of iron using $NaClO_3$ and $H_2O_2$

| Fe Concentration target [ppm] | Na Chlorate Concentration added [ppm] | Sample ID | Fe Conc Unfiltered [ppm] - ICP | Fe Conc Filtered [ppm] - ICP | Reduction in Fe (% reduction) |
|---|---|---|---|---|---|
| 5 | 5 | 7193-80A | 3.8 | 0.92 | 75.79 |
| 5 | 10 | 7193-80B | 4.2 | 0.63 | 85.00 |
| 5 | 25 | 7193-80C | 4.3 | 0.26 | 93.95 |
| 5 | 50 | 7193-80D | 4.2 | 0.42 | 90.00 |
| 5 | 100 | 7193-80E | 4.1 | 0.35 | 91.45 |
| 5 | 0 | 7193-80F | 4.3 | 4.6 | -6.98 |
| 20 | 20 | 7193-80G | 17.0 | 9.6 | 43.53 |
| 20 | 40 | 7193-80H | 16.0 | 7.9 | 50.63 |
| 20 | 100 | 7193-80I | 17.0 | 2.3 | 86.47 |
| 20 | 200 | 7193-80J | 17.0 | 2.2 | 87.06 |
| 20 | 400 | 7193-80K | 16.0 | 2.4 | 85.00 |
| 20 | 0 | 7193-80L | 18.0 | 18.0 | 0.00 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "an oxidant" is intended to include "at least one oxidant" or "one or more oxidants."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of oxidizing a component of an aqueous medium, comprising:
    adding a first composition to the aqueous medium, wherein the first composition is an oxidizing composition comprising hydrogen peroxide, and a chlorate or alkali metal salt thereof,
    adding a second composition comprising chlorine dioxide to the aqueous medium, and
    oxidizing the component, wherein the component is a microbial metabolite.

2. The method of claim 1, wherein the oxidizing composition is added to the aqueous medium at a concentration of from about 0.1 ppm to about 1000 ppm.

3. The method of claim 1, wherein the chlorate is sodium chlorate.

4. The method of claim 1, wherein the component further comprises a metal, and the metal is selected from the group consisting of iron, manganese, copper, and any combination thereof.

5. The method of claim 1, wherein the microbial metabolite is geosmin, methylisoborneol (MIB), microcystin, cyanotoxins, or any combination thereof.

6. The method of claim 1, wherein the chlorine dioxide is added to the aqueous medium at a concentration of about 0.02 ppm to about 20 ppm.

7. The method of claim 6, wherein the chlorine dioxide is added to the aqueous system before, after, and/or concurrently with the oxidizing composition.

8. The method of claim 6, wherein the chlorine dioxide is added continuously or intermittently to the aqueous medium.

9. The method of claim 1, further comprising exposing the aqueous medium to ultraviolet light.

10. The method of claim 1, wherein the oxidizing composition is added continuously or intermittently to the aqueous medium.

11. The method of claim 1, further comprising measuring a concentration of one or more ingredients of the oxidizing composition in the aqueous medium.

12. The method of claim 11, further comprising adjusting a concentration of the oxidizing composition being added to the aqueous medium based on the measured concentration.

13. The method of claim 1, further comprising measuring a concentration of one or more of the components in the aqueous medium.

14. The method of claim 13, further comprising adjusting a concentration of the oxidizing composition being added to the aqueous medium based on the measured concentration.

15. The method of claim 1, further comprising measuring a property of the aqueous medium, wherein the property is selected from the group consisting of pH, temperature, turbidity, ion concentration, microbial load, suspended solids, total dissolved solids, oxidation reduction potential (ORP), conductivity, and any combination thereof.

16. The method of claim 1, wherein the oxidizing composition is a liquid.

17. The method of claim 1, wherein the oxidizing composition has substantially no biocidal effect at a use concentration.

18. The method of claim 1, wherein the aqueous medium is municipal water, waste water, recirculating water, industrial process water, food and beverage ingredient water, influent stream from a river, influent stream from a lake, or any combination thereof.

19. The method of claim 1, wherein the component further comprises a metal, mineral, organic molecules, or any combination thereof.

20. A method of oxidizing a component of an aqueous medium, comprising:
    adding a first composition to the aqueous medium, wherein the first composition is an oxidizing composition consisting of hydrogen peroxide, a chlorate or alkali metal salt thereof, and water,
    adding a second composition comprising chlorine dioxide to the aqueous medium, and
    oxidizing the component, wherein the component is a microbial metabolite.

* * * * *